United States Patent [19]

Haneda

[11] Patent Number: 5,293,207
[45] Date of Patent: Mar. 8, 1994

[54] COLOR IMAGE FORMING APPARATUS WITH BLACK TONER CONTROL

[75] Inventor: Satoshi Haneda, Hachioji, Japan
[73] Assignee: Konica Corporation, Tokyo, Japan
[21] Appl. No.: 7,259
[22] Filed: Jan. 21, 1993
[30] Foreign Application Priority Data
  Jan. 29, 1992 [JP] Japan ................................. 3-38757
[51] Int. Cl.⁵ .......................................... G03G 15/01
[52] U.S. Cl. .................................. 355/327; 346/157; 358/518; 358/401
[58] Field of Search ................ 355/326, 327; 346/157, 346/160; 358/75, 80, 450, 401

[56] References Cited
U.S. PATENT DOCUMENTS 5,047,844  9/1991  Ikeda et al. ............................ 358/80
5,119,187  6/1992  Ikeda et al. ............................ 358/80

Primary Examiner—R. L. Moses
Attorney, Agent, or Firm—Frishauf, Holtz, Goodman & Woodward

[57] ABSTRACT

In a color image forming machine in which are provided a charger by which an image carrier is charged, an image exposing device by which a latent image corresponding to image data composed of different color data is formed on the image carrier. A plurality of developing devices by which the latent image is developed by different color toners. Different color toner images are repeatedly registered to form a color image. The color image forming machine is further provided with a converting device by which the image data is converted so that an amount of black toner to be used can be increased more than that of other color toners to be used.

3 Claims, 10 Drawing Sheets

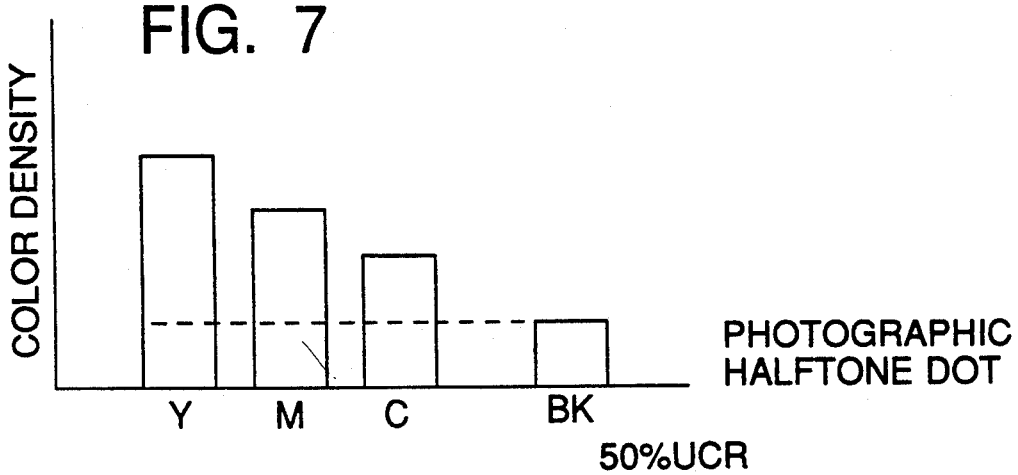
FIG. 7 — PHOTOGRAPHIC HALFTONE DOT, 50%UCR
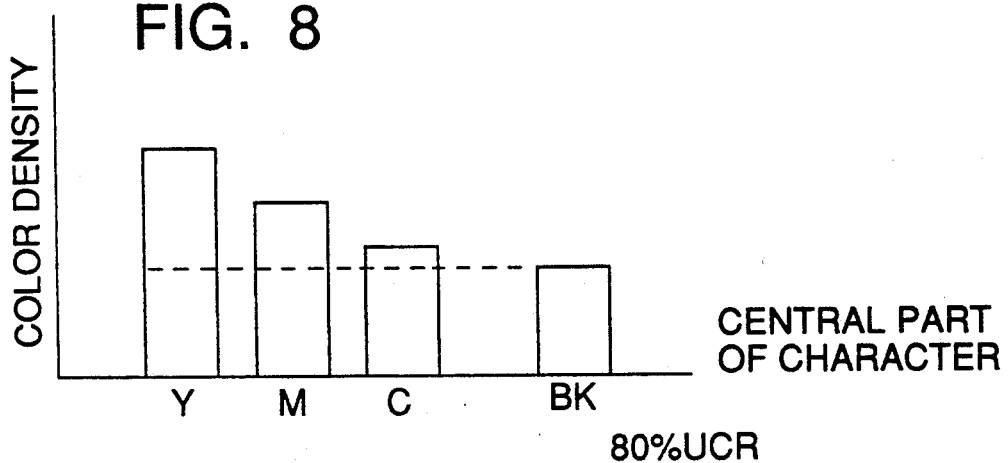
FIG. 8 — CENTRAL PART OF CHARACTER, 80%UCR
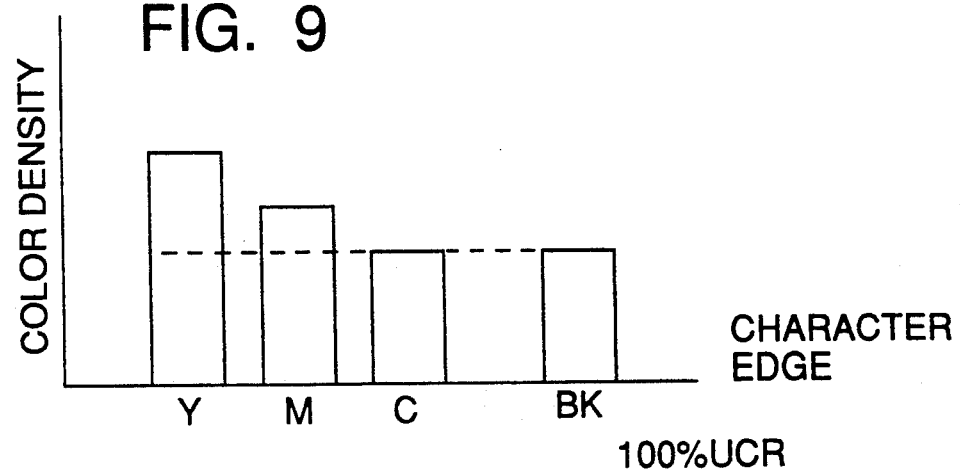
FIG. 9 — CHARACTER EDGE, 100%UCR

COLOR IMAGE FORMING APPARATUS WITH BLACK TONER CONTROL

BACKGROUND OF THE INVENTION

The present invention relates to a color image forming apparatus in which different color toner images are repeatedly superimposed in order to form a color image, an especially to a color image forming apparatus which is used in the field of electrostatic recording and electrophotography.

Conventionally, in order to form a color image according to, for example, an electrophotographing method, processes of charging, image exposing, developing, and transferring are repeated for each component color, and color toner images are superimposed on a recording sheet. That is, by using light which is modulated by color information from a color original document, the above-described processes are repeated four times and color toner images are obtained so that a color image formed by yellow, magenta, cyan and black toners can be formed.

However, in the above-described color image forming method, it is necessary to transfer one color toner image onto a transfer body each time after development has been completed for each color toner. Therefore, problems arise such as the dimensions of the apparatus must be increased, and the recording process becomes complicated, so that a large amount of time is wasted. Further, since each color toner image is transferred onto a recording sheet after each process, transfer slippage occurs, and thus the quality of the color image is decreased. In order to solve the foregoing problems, a color image forming method is known, in which a plurality of toner images are superimposed onto the same photoreceptor so that a transferring process can be completed at one time.

However, in the above-described prior art method, for example, yellow, magenta, cyan and black toner images are superimposed, to form a color image. However, it is more difficult to make black toner adhere to the toner surface than the other toners. That is, as shown in FIG. 1 (see especially the edge effect), for example, a yellow toner, (which is the first color toner in this process), forming a toner image 100 can easily be made to adhere onto an edge portion. In FIG. 1, each when image exposing is used in order to make a toner image 101 it adheres to the toner surface (as shown by a two-dotted chain line) when magenta, cyan, and black toner images are subsequently superimposed onto the toner surface in the same way as the yellow toner image and after the yellow toner image is made to adhere the photoreceptor surface, it is difficult to make the toner image 101 adheres an edge portion after the yellow color toner adheres to the toner surface. Thus, it becomes more difficult to superimpose one toner image onto the surface of another toner image as the number of superimposing processes advances further. Furthermore, since the toner image 100 is exposed from the upper portion as shown in FIG. 3, an edge portion of the image such as, for example, a character becomes thicker because toner splashes occur when the toner image is exposed again.

As described above, when a later development is performed, the toner is difficult to make toner adhere onto an edge portion of the toner image obtained by the former development, and further, the toner is disturbed, so that a hue of the image is changed, or the image can be splattered with toner.

SUMMARY OF THE INVENTION

In view of the foregoing, the object of the present invention is to provide a color image forming apparatus in which a change of hue at an edge portion of an image, and splashing of toner on an image, can be decreased.

In order to solve the foregoing problems, the first embodiment of the present invention is as follows. A color image forming apparatus has a charging means for charging an image carrier, an image exposure means for forming a latent image corresponding to image data comprising different plural color data on the charged image carrier, and a plurality of developing means for developing the latent image with different color toners. The different color toner images are repeatedly superimposed to form a color image. The color image forming apparatus further comprises conversion means for converting the image data so that an amount of black toner to be used can be increased to greater than an amount of other color toners that are to be used.

A second embodiment of the color image forming apparatus of the present invention includes a conversion means for converting the image data by changing an under color removal (UCR) amount.

In the third embodiment of the color image forming apparatus of the present invention, a conversion means converts the image data by changing a modulation transfer function (MTF).

The fourth embodiment of the color image forming apparatus of the present invention includes a conversion means in which the image data by changing a gamma ($\gamma$) characteristic thereof.

In the first embodiment of the present invention, image processing is conducted in which the amount of black toner to be used is increased with respect to the amounts of other color toners which have been used. Therefore, on an edge portion of the image, an amount of black toner that adheres to the toner surface is decreased and splashing of toner is prevented when an exposure amount at the time when other color toners are used is decreased. Due to the foregoing, even when block toner is developed after the other color toners, black toner is sufficiently superimposed on the edge portion of the, image. Further, even when black toner is developed before than other color toners, splashing of black toner is decreased on the edge portion of the image.

Further, in the second embodiment of the present invention, the image data is converted by a change of an amount of under color removal (UCR). In the third embodiment of the present invention, the image is converted by a change of a modulation transfer function (MTF). In the fourth embodiment of the present invention, the image is converted by gamma ($\gamma$). In these structures, the amount of black toner to be used can be increased with respect to the amounts of other color toners which have been used, by simple structures. Further, by a combination of the under color removal (UCR) and the modulation transfer function (MTF) or gamma($\gamma$), a more preferable synergetic effect can be obtained.

BRIEF DESCRIPTION OF THE DRAWINGS

FIG. 7 is a view showing the UCR for photographic halftone dots.

FIG. 8 is a view showing the UCR for a central part of a character.

FIG. 9 is a view showing the UCR for a character edge.

DETAILED DESCRIPTION OF THE PREFERRED EMBODIMENTS

Figure 1:
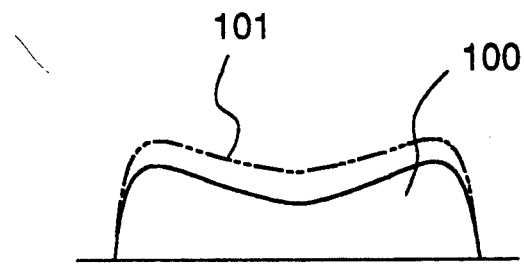
FIG. 1 is a conceptional view showing a condition in which toner images are superimposed.
Figure 2:
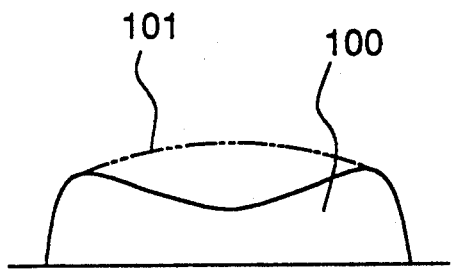
FIG. 2 is a conceptional view showing a condition in which toner images are superimposed.
Figure 3:
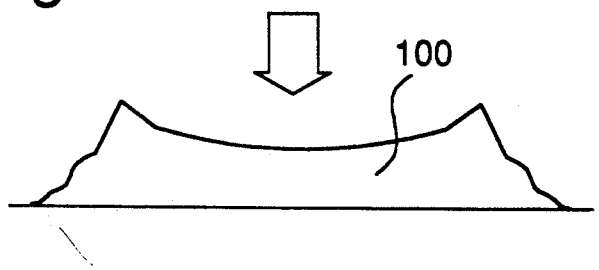
FIG. 3 is a conceptional view showing a condition in which exposure is conducted when toner images are superimposed.
Figure 4:
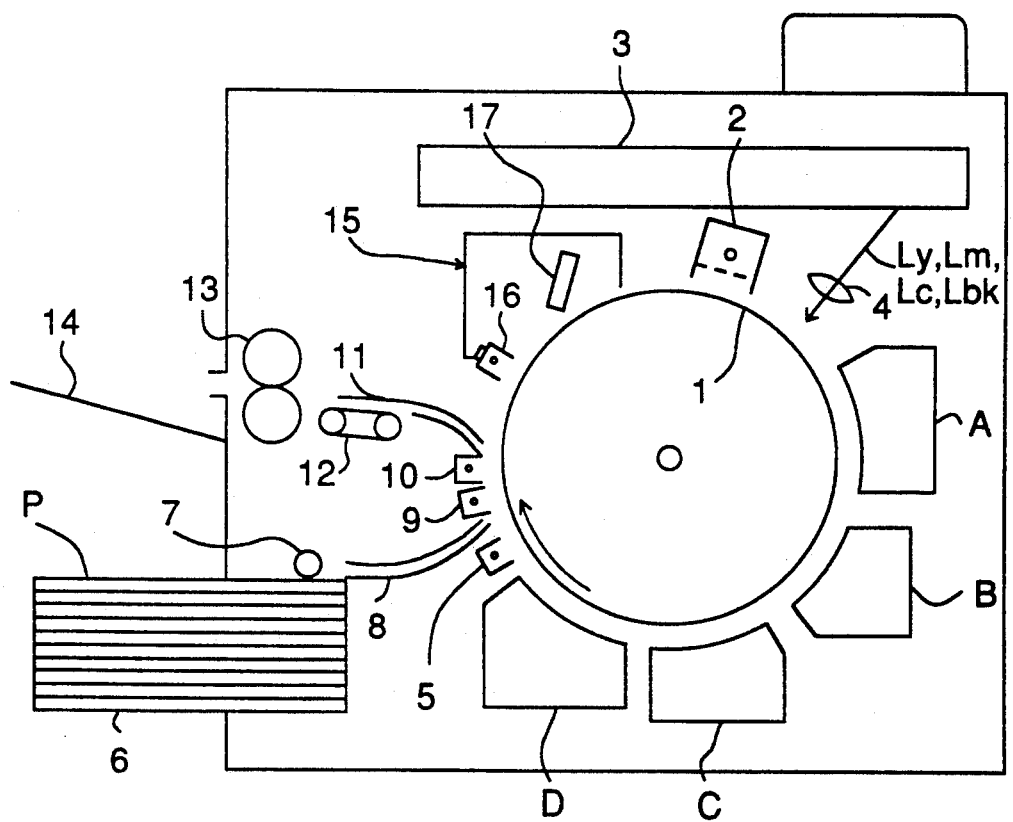
FIG. 4 is a view showing a general structure of a color image forming apparatus.

Referring to the drawings, a color image forming apparatus of the present invention will be described in detail as follows. FIG. 4 is a schematic illustration which shows a general structure of the color image forming apparatus of the present invention.

FIG. 4 shows a color image forming apparatus in which an output signal from an image pickup element by which an original document is scanned, a transmission signal from another apparatus, or data of a memory is recorded as image data. A drum-shaped photoreceptor 1 as an image carrier is a selenium photoreceptor which is rotated in the arrowed direction, and which is uniformly charged by a scorotron charger 2 as a charging means. Next, yellow data in image data consisting of yellow, magenta, cyan, and black data, is input at first into a laser unit 3 which is an image exposure means. In the laser unit 3, laser beam Ly which is modulated and reflected by a rotatable polygonal mirror, image-exposes the surface of the photoreceptor 1, and thereby an electrostatic latent image is formed. The electrostatic latent image is reversal-developed by developing unit A which is a first developing means, and the first toner image (yellow toner image) is formed on the photoreceptor 1.

The toner image is not transferred onto a recording sheet at this time, and the photoreceptor 1 is charged again by the scorotron charger 2, so that a toner image based on the magenta data is formed on the photoreceptor 1. That is, the electrostatic latent image is formed by image-exposure by laser beam Lm, and the second toner image (magenta toner image) is formed by the second developing unit B. In the same way, as the result of image-exposure by laser beam Lc according to cyan data and development by the third developing unit C, and image-exposure by laser beam Lbk according to black data and development by the fourth developing unit D, the third toner image (cyan toner image) and the fourth toner image (black toner image) are formed. In the manner described above, the first to the fourth toner images are superimposed on the photoreceptor 1, and a multicolor toner image is formed thereon.

The toner image on the photoreceptor 1 is pre-transfer charged by a charger 5, and transferred by a transfer unit 9 onto recording sheet P which is supplied through a sheet feeding roller 7 and a guide 8. Recording sheet P on which the toner image has been transferred, is separated from the photoreceptor 1 by a separation unit 10, conveyed by a conveyance belt 12 through a guide 11, and sent into a heat roller 13. Recording sheet P is delivered onto a delivery tray 14 after recording sheet P has been thermally fixed by the heat roller 13. The photoreceptor 1 by which transfer operation has been completed, is discharged by a discharger 16 which is not used during toner image formation, and after that, toner remaining on the surface of the photoreceptor 1 is removed by a blade 17 of a cleaning unit 15 which is not used during toner image formation.

Figure 5:
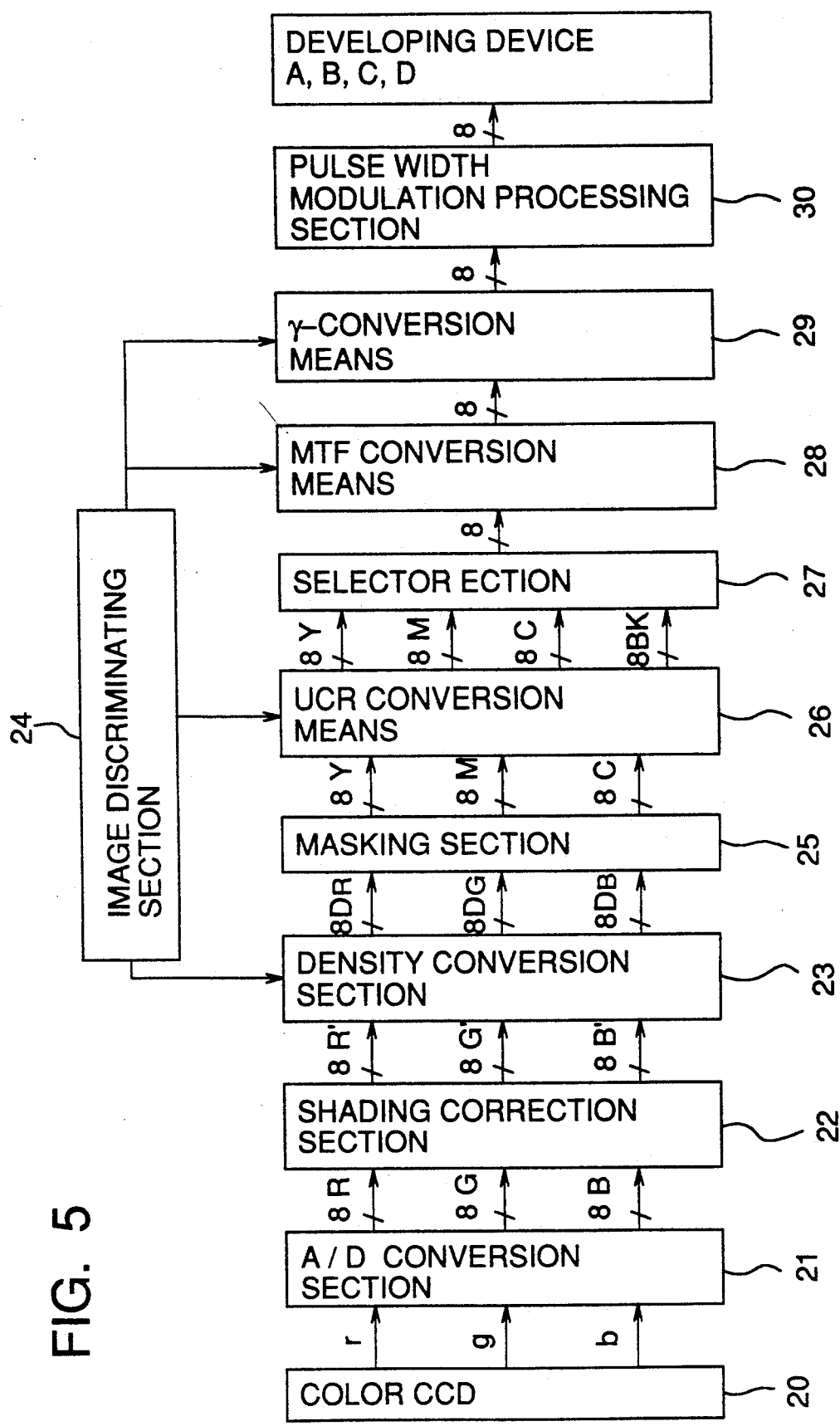
FIG. 5 is a block diagram of image processing in the color image forming apparatus.

Next, referring to FIG. 5, image processing in the color image forming apparatus of the present invention will be described as follows.

The color original document is read out by a color CCD 20, an analog signal in a television image in which, brightness signals of three primary color blue, green and red, in an additive color process are included. The analog signal, is converted into a digital image signal by an A/D conversion section 21, and shading correction is conducted by a shading correction section 22. This shading correction is a correction for sensitivity dispersion. The density of the image data which has been shading-corrected, is converted in a density conversion section 23, and at the same time, a central part of a character, a character edge, and a photographic halftone dot are discriminated in an image discriminating section 24.

The image signal, the density of which has been converted in the density conversion section 23, is processed by masking in a masking section 25, and converted into a density level of three primary colors in a subtractive color process, yellow, magenta, and cyan, by subtracting density levels of three primary colors from their respective saturation amounts, and the image data is converted when the under color removal (UCR) amount is changed by a UCR conversion means 26 according to the discrimination in the image discriminating section 24. In the foregoing, the under color removal (UCR) is defined as the decrease in the respective quantities of yellow, magenta, and cyan toners in the color image which are replaced by an additional quantity of black toner, and especially the replacement of the color toners by black toner at those portions of the developed images which four color toners are superimposed so that the color thereof becomes gray or solid-black.

Further, the image data is selected in a selector section 27, and the modulation transfer function (MTF) is changed by the MTF conversion means 28 according to the discrimination in the image discriminating section 24, and thereby the image data is converted. In the foregoing, the modulation transfer function (MTF) method is a method by which only an absolute value of an OTF (optical transfer function) is processed without considering a change of phase, and the OTF is a function in which changes of contrast and phase of an object image, the brightness of which is sinusoidally changed in one direction, is expressed using a spatial frequency as a parameter.

Further, gamma (γ) is changed by a γ conversion means 29 and the image data is changed thereby. Gamma (γ) is defined as an inclination of a linear portion of a characteristic curve showing the relation between an exposure amount and blackened density, and used as the numerical value by which gradation of the image is expressed.

Then, the image data which is image-processed, is pulse-width-modulated in a pulse width modulation processing section 30, and the image is reversal-developed by developing units A, B, C, and D using each color toner according to the image data.

The color image forming apparatus of the present invention comprises a converting means by which the image data is converted so that the amount of black toner to be used is increased to be greater than the quantities of other color toners which have been used, at the edge portion of the toner image which is formed by superimposition, and thereby even when the black toner is developed after the other color toners, the black toner is sufficiently superimposed on the edge portion of the image, and further, even when the black toner is developed before than other toners, splattering of the black toner is decreased at the edge portion of the image.

In the above-described conversion means, the image data is converted by a change of the under color removal (UCR) amount by a UCR conversion means 26, a change of the modulation transfer function (MTF) by a MTF conversion means 28, or a change of gamma (γ) by a γ conversion means 29, and thereby the amount of the black toner to be used is increased more than the amounts of other color toners which have been used.

Referring to FIGS. 6 to 11, an embodiment in which the image data is converted by a change of the under color removal (UCR) by the UCR conversion means 26, will be described as follows.

Figure 6:
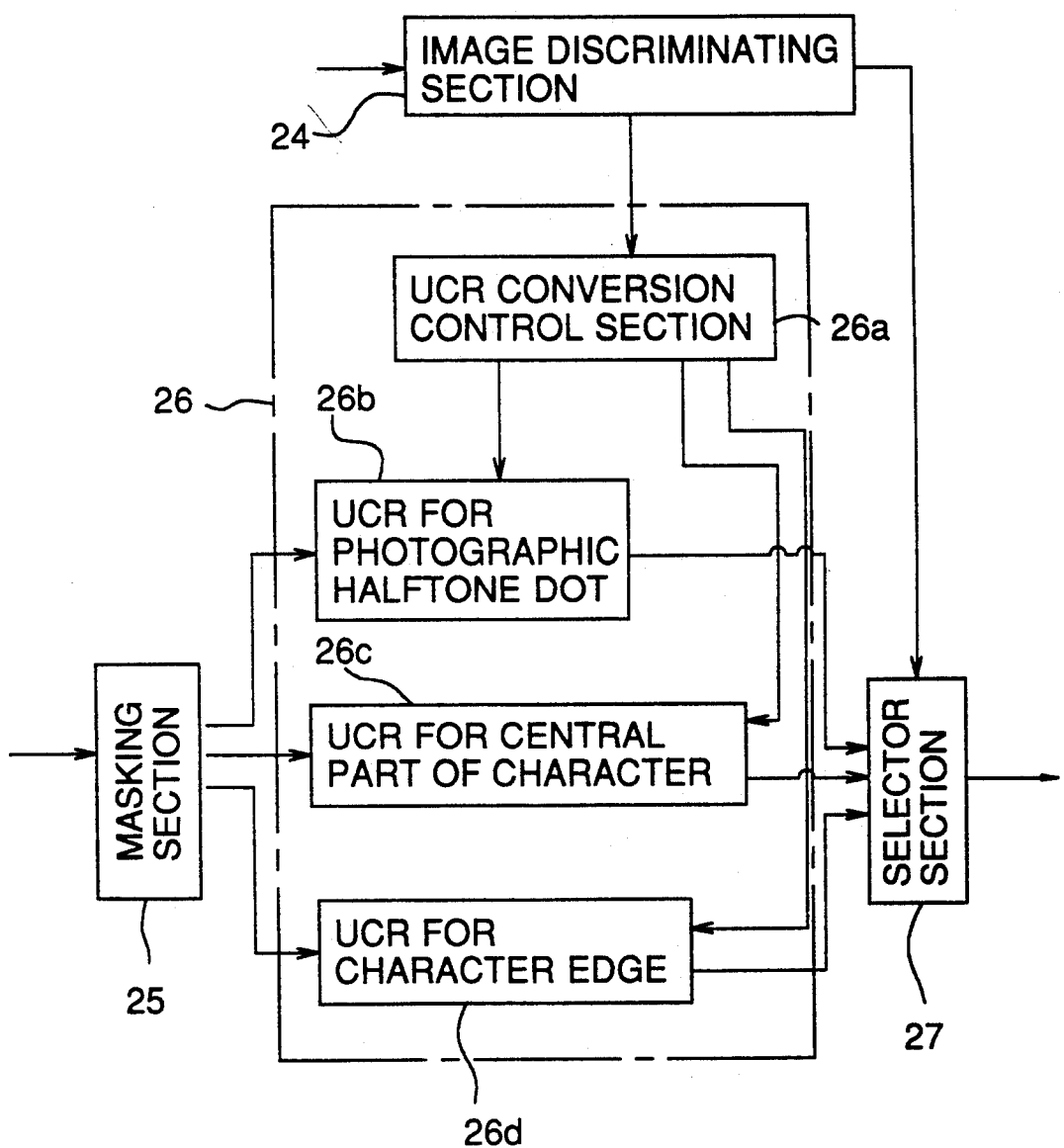
FIG. 6 is a view showing a structure of a UCR conversion means.

FIG. 6 is a view showing the structure of the UCR conversion means. The UCR conversion means 26 is provided with a UCR conversion control section 26a, a UCR for a photographic halftone dot 26b, a UCR for a central part of a character 26c and a UCR for a character edge 26d. The UCR for a photographic halftone dot 26b is set, for example, at 50 % UCR as shown in FIG. 7, the UCR for a central part of a character 26c is set, for example, at 80 % UCR as shown in FIG. 8, and the UCR for a character edge 26d is set, for example, at 100 % UCR as shown in FIG. 9.

The character and the photographic halftone dot are separated in the image discriminating section 24, and further, the central part of the character and the character edge are separated therein. Based on the image discrimination, any of the UCR for the photographic halftone dot 26b, the UCR for the central part of the character 26c, and the UCR for the character edge is selected according to the image, and the image data is converted by the change of the under color removal (UCR).

Figure 10:
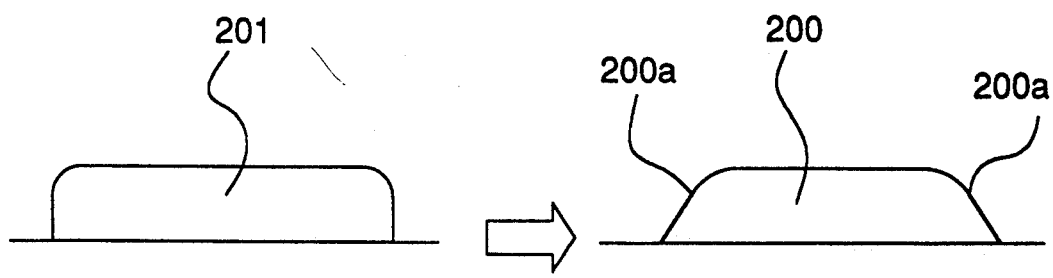
FIG. 10 is a conceptional view showing development of yellow, magenta, and cyan toner when an image data is converted by a change of the under color removal (UCR) amount, the modulation transfer function (MTF) or gamma($\gamma$).

A case in which the image data is converted by the change of the under color removal (UCR) in the case where yellow, magenta, and cyan toner images are developed earlier and the black toner image is developed later thereon, will be explained according to FIGS. 10 and 11 as follows. In the image discriminating section 24, the character is separated by the image discrimination, and the UCR for the central part of the character 26c is selected at the central part of the character, and the UCR for the character edge 26d is selected at the character edge. The black toner is easy to adhere onto a toner image 200 which is formed earlier by yellow, magenta, and cyan toners when the under color removal (UCR) is increased on a character edge 200a with respect to a conventional toner image 201 and the exposure amount on the character edge 200a is decreased as shown in FIG. 10.

Figure 11:
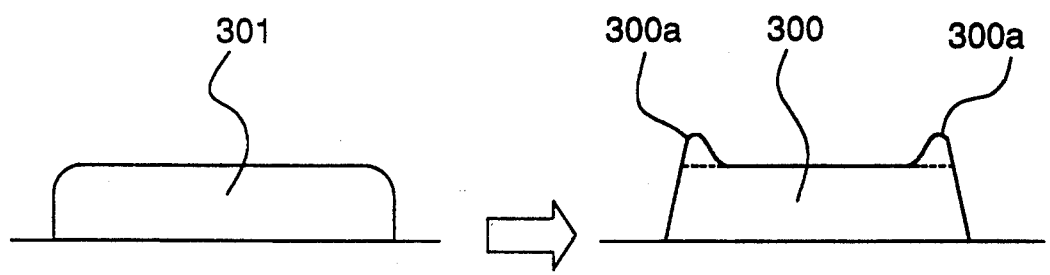
FIG. 11 is a conceptional view showing development of a black toner image when the image data is converted by a change of the under color removal (UCR) amount, the modulation transfer function (MTF) or gamma ($\gamma$).

In a toner image 300 which is formed later by the black toner, the black toner is easy to adhere when the under color removal (UCR) is increased on a character edge 300a with respect to a conventional toner image 301 and the exposure amount on the character edge 300a is increased as shown in FIG. 11.

The amount of the black toner to be used is increased with respect to the amounts of other toners on the edge portion of the toner image which is formed by superimposition as described above, and thereby even when the black toner is developed later than other color toners, the black toner is sufficiently superimposed onto the edge portion of the image and the change of hue of the image is decreased.

A case in which the image data is converted by the change of the under color removal (UCR) in the case where the black toner image is developed earlier and yellow, magenta, and cyan toner images are developed later thereon, will be explained according to FIGS. 10 and 11 as follows. In this case also, the character is separated by the image discrimination in the image discriminating section 24, and then, the UCR for the central part of the character 26c is selected at the central part of the character, and the UCR for the character edge 26d is selected at the character edge. In the toner image 300 which is formed earlier by the black toner, the under color removal (UCR) is increased with respect to the conventional toner image 301 on the character edge 300a, and the exposure amount on the character edge 300a is increased as shown in FIG. 11.

In the toner image 200 which is formed later by yellow, magenta, and cyan toners, when the under color removal (UCR) is increased with respect to the conventional toner image 201 on the character edge 200a and the exposure amount on the character edge 200a is decreased as shown in FIG. 10, splashing of the black toner image which has been formed earlier is decreased. Even when the amount of the black toner to be used is increased more than the amount of other color toners on the edge portion of the toner image which is formed by superimposition, and the black toner is developed later than other color toners, splashing of the black toner on the edge portion of the image is also decreased.

It is preferable that the ratio of the under color removal (UCR) is 30 to 70% for the photographic halftone dot, 60 to 90% for the central part of the character, and 90 to 100% for the character edge.

Next, an embodiment in which the image data is converted by a change of the modulation transfer function (MTF) by the MTF conversion means 28, will be explained according to FIGS. 12 to 14 as follows.

Figure 12:
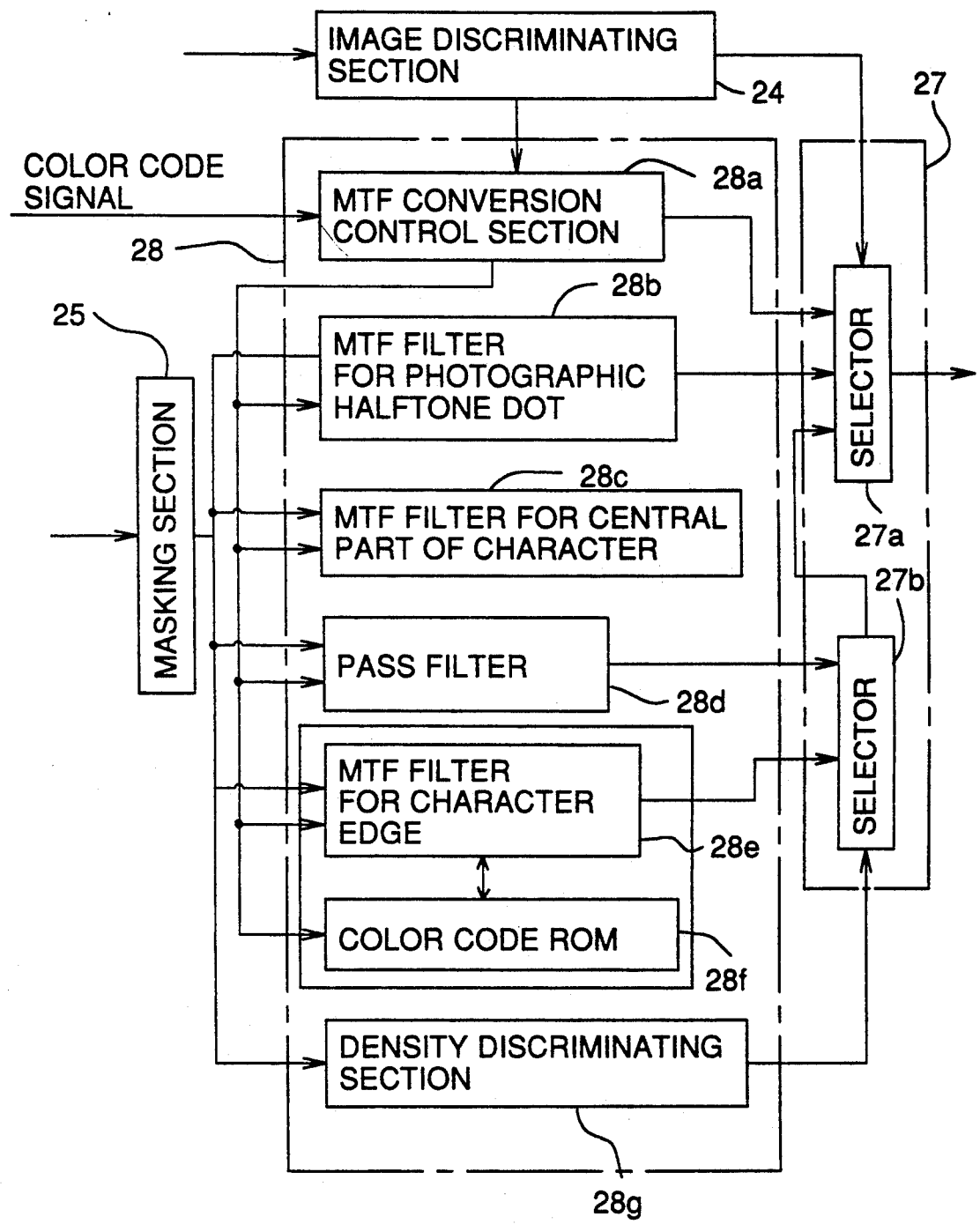
FIG. 12 is a view showing a structure of a MTF conversion means.
Figure 13:
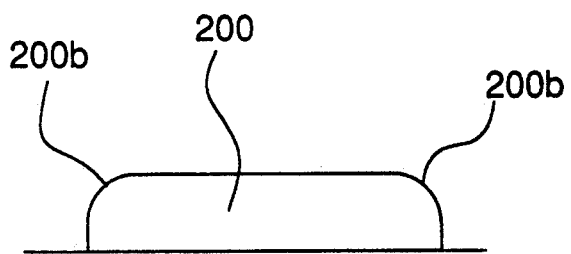
FIG. 13 is a conceptional view showing development of toner images of yellow, magenta, and cyan when the image data is converted by a change of the modulation transfer function (MTF).

FIG. 12 is a view showing the structure of the MTF conversion means. In FIG. 12, the MTF conversion means 28 is provided with a MTF conversion control section 28a, a MTF filter for a photographic halftone dot 28b, a MTF filter for a central part of a character 28c, a pass filter 28d, a MTF filter for a character edge 28e, a color code ROM 28f, and a density discriminating section 28g, and a selector 27 is composed of the first selector 27a and the second selector 27b.

The image data is converted by the following operations: the character and the photographic halftone dot are separated in the image discriminating section 24; further the central part and character edge are separated therein; based on the image discrimination, any of the MTF filter for the photographic halftone dot 28b, the MTF filter for the central part of the character 28c, the pass filter 28d, and the MTF filter for the character edge 28e is selected according to the image; further, the color ROM 28f is controlled by a color code signal; and the modulation transfer function (MTF) is changed. Further, when the character is separated in the image discriminating section 24, the selector 27b is controlled, and thereby, the MTF filter for the character edge 28e is selected in the case where the density is not less than a predetermined density in the density discriminating section 28d, and the pass filter 28d is selected in the case where the density is not more than a predetermined density. The MTF filter for the character edge 28e is switched by the control of the color ROM 28f according to the color code signal. For example, when the color code signal is a black code signal, the MTF filter for the character edge 28e is switched to an emphasized edge type MTF filter, and when the color code signal is a yellow, a magenta or a cyan code signal, the MTF filter for the character edge 28e is switched to a vignetted edge type MTF filter.

Next, a case in which the image data is converted by a change of the modulation transfer function (MTF) in the case where yellow, magenta, and cyan toner images are developed and the black toner image is formed thereon, will be explained according to FIGS. 10, 11 and 13 as follows. The character is separated by the image discrimination in the image discriminating section 24, and when the color code signal is a yellow, a magenta or a cyan code signal, the vignetted edge type MTF filter is selected as the MTF filter for the character edge 28e in the color ROM 28f. In this case, the black toner is easy to adhere on yellow, magenta, and cyan toner images 200 which are formed earlier than the black toner image, when the exposure amount on the character edge 200a is decreased with respect to the conventional toner image 201 as shown in FIG. 10.

The character edge 22a is sometimes spread when the exposure amount on the character edge 200a is decreased by the vignetted edge type MTF filter, and therefore, the vignetted edge type MTF filter is selected only when the density of the image is not less than a predetermined density in the density discriminating section 28g, and when the density of the image is not more than a predetermined density, the vignetted edge type MTF filter is not selected. The black toner is easy to adhere onto other color toner images while both shoulders of the toner images are lowered like the character edge 200b as shown in FIG. 13 and are not spread.

Concerning a black toner image 300 which is formed later than other color toner images, the emphasized edge type MTF filter is selected as the MTF filter 28e in the color ROM 28f. The black toner is easy to adhere onto other color toner images when the exposure amount on a character edge 300a is increased with respect to a conventional toner image 301 as shown in FIG. 11. Also in the case where the black toner image 300 is formed, the emphasized edge type MTF filter is selected only when the density of the toner image is not less than a predetermined density in the density discriminating section 28g, and the emphasized edge type MTF filter is not selected when the density of the toner image is not more than a predetermined density, and thereby, the character edge 300a is not spread and the black toner is easy to adhere thereto.

A case in which the image data is converted by a change of the modulation transfer function (MTF) in the case where the black toner image is developed earlier, and yellow, magenta, and cyan toner images are formed later thereon, will be explained according to FIGS. 11 and 14 as follows. In this case also, like the foregoing, concerning the black toner image 300 which is formed earlier, the emphasized edge type MTF filter is selected as the MTF filter for character edge 28e in the color ROM 28f, and the exposure amount on the character edge 300a is increased with respect to the conventional toner image 301 as shown in FIG. 11. Also in the case where the black toner image 300 is formed, the emphasized edge type MTF filter is selected only when the density of the toner image is not less than a predetermined density in the density discriminating section 28g, and the emphasized edge type MTF filter is not selected when the density of the toner image is not more than a predetermined density, and thereby, the character edge 300a is not spread and the black toner is increased.

Figure 14:
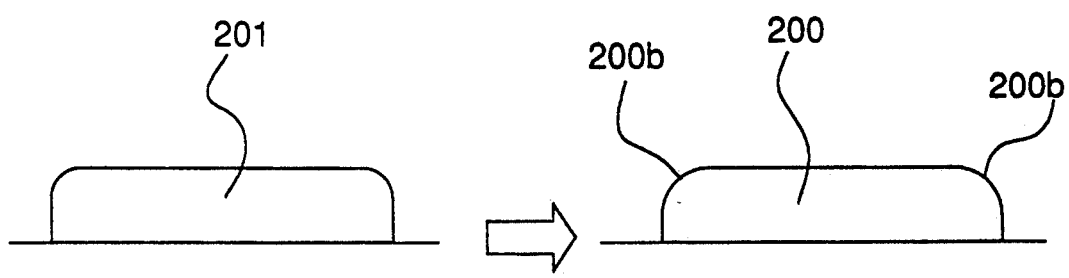
FIG. 14 is a conceptional view showing development of toner images of yellow, magenta, and cyan when the image data is converted by a change of the modulation transfer function (MTF).

Concerning yellow, magenta, cyan toner images 200, the vignetted edge type MTF filter is selected as the MTF filter for the character edge 28e in the color ROM 28f, and when the exposure amount on the character edge 200b is decreased with respect to the conventional toner image 201 as shown in FIG. 14, splashing of the black toner is decreased on the edge of the image. In this case also, when the exposure amount on the character edge 200b is decreased by the vignetted edge type MTF filter, the character edge 200b is sometimes spread. Therefore, the vignetted edge type MTF filter is selected only when the density of the toner image is not less than a predetermined density, and the vignetted edge type MTF filter is not selected when the density of the toner image is not more than a predetermined density, and the exposure amount is decreased and the character edge 200b is not spread. Therefore, even when the amount of black toner to be used is increased more than the amounts of other color toners on the edge of the toner image which is formed by superimposition, and the black toner is developed later than other color toners, splashing of the black toner can be decreased on the edge of the image.

Next, an embodiment in which the image data is converted by a change of gamma ($\gamma$) by the $\gamma$ conversion means 29 will be explained according to FIGS. 10, 11, 15, and 16 as follows.

Figure 15:
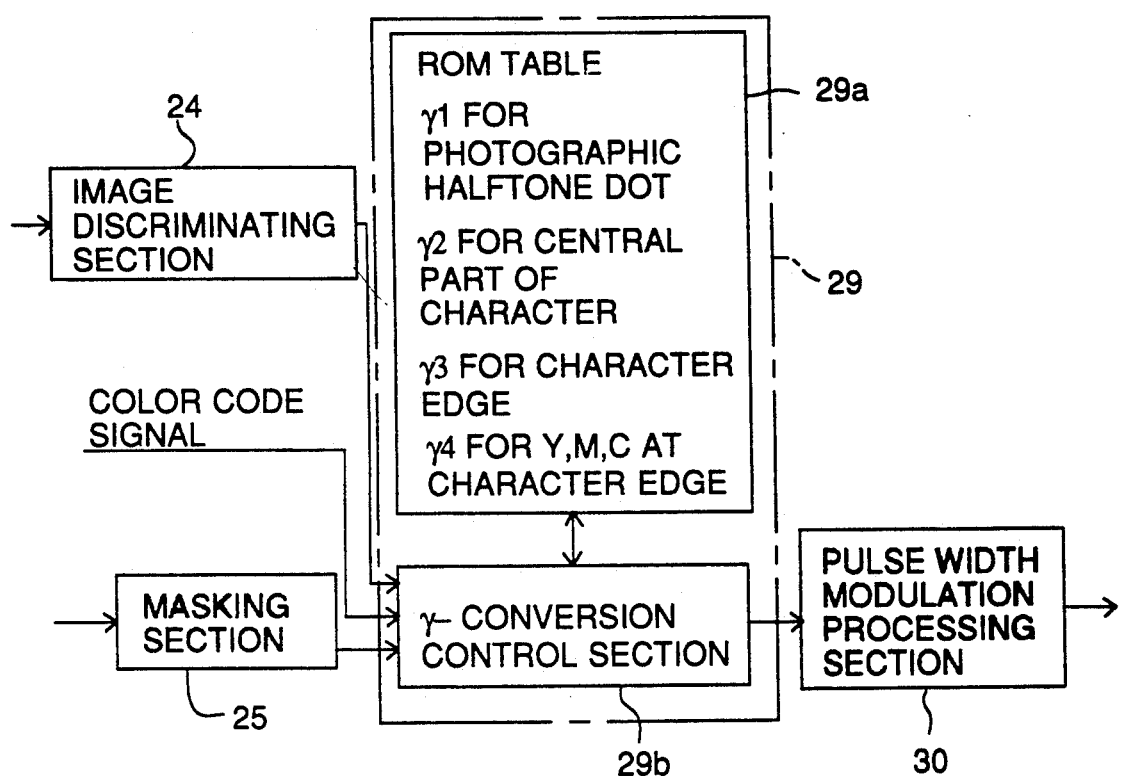
FIG. 15 is a view showing a structure of a $\gamma$ conversion means.
Figure 16:
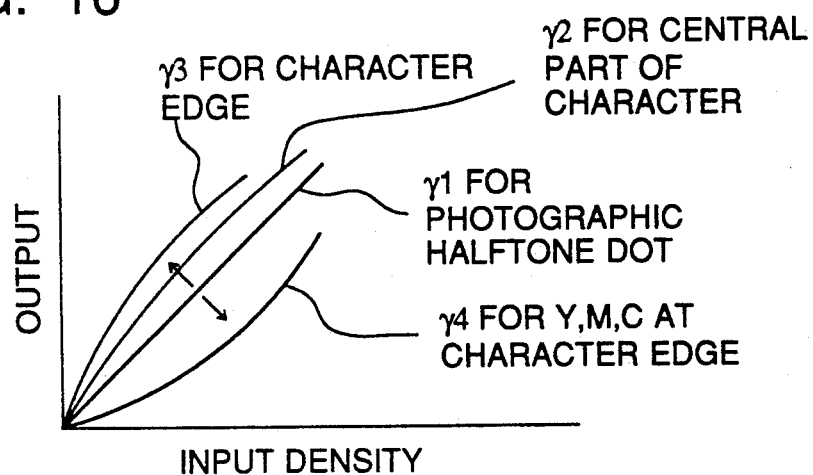
FIG. 16 is a view showing gamma ($\gamma$) in a ROM table.

FIG. 15 is a view showing a structure of the $\gamma$ conversion means. The $\gamma$ conversion means 29 is provided with a ROM 29a in which a table is included, and a γ-conversion control section 29b. γ1 for the photographic halftone dot, γ2 for the central part of the character, γ3 for black at the character edge, and γ4 for Y, M, C at the character edge are stored in a table in the ROM 29 a as shown in FIG. 16.

The image data and the color code signal which are processed by a masking operation in the masking section 25, are inputted into a γ-conversion control section 29b in the γ-conversion means 29. Further, according to the image discrimination, that is, the separation of the photographic halftone dot from the character and further the separation of the edge of the character from the central part of the character in the image discriminating section 24, any of the γ1 for the photographic halftone dot, the γ2 for the central portion of the character, the γ3 for black at the character edge, and the γ4 for Y, M, C at the character edge, which are stored in the table of the ROM 29a corresponding to the image, is selected and the image data is converted by the change of gamma (γ).

For example, when the photographic halftone dot is separated in the image discriminating section 24, the γ1 for the photographic halftone dot is selected. When the character is separated in the image discriminating section 24, the γ2 for the central part of the character is selected at the central portion of the character, and any of the γ3 for black at the character edge, and the γ4 for Y, M, C at the character edge is selected at the character edge according to the color code signal.

A case in which the image data is converted by a change of gamma (γ) in the case where yellow, magenta, and cyan toner images are developed and the black toner image is formed thereon, will be explained according to FIGS. 10, and 11 as follows. The character is separated by the image discrimination in the image discriminating section 24, and when the color code signal is a yellow, magenta, or cyan code signal, the γ4 for Y, M, C at the character edge is selected from the table in the ROM 29a in the γ-conversion control section 29b. In this case, the black toner is easy to adhere onto the toner image 200 which is formed earlier by yellow, magenta, and cyan toners when the value of Gamma (γ) at the character edge 200a is reduced so that the exposure amount is decreased with respect to the conventional toner image 201 as shown in FIG. 10.

Concerning the black toner image 300 which is formed later than other color toner images, the black toner is easy to adhere when the γ3 for black at the character edge is selected according to the color code signal and the value of gamma (γ) at the character edge 300a is increased with respect to the conventional toner image 301 as shown in FIG. 11.

A case in which the image data is converted by a change of gamma (γ) in the case where the black toner image is developed and yellow, magenta, and cyan toner images are formed thereon, will be explained according to FIGS. 10, and 11 as follows. In this case also, concerning the black toner image 300 which is formed earlier than other color toner images, the black toner is easy to adhere when the γ3 for black at the character edge is selected according to the color code signal and the value of gamma (γ) at the character edge 300a is increased with respect to the conventional toner image 301 as shown in FIG. 11.

In the toner image 200 which is formed later by yellow, magenta, and cyan toners, the black toner is easy to adhere when the value of gamma (γ) at the character edge 200a is decreased with respect to the conventional toner image 201 so that the exposure amount is decreased as shown in FIG. 10. Even when the amount of the black toner to be used is increased more than the amount of other color toners on the edge portion of the toner image which is formed by superimposition, and the black toner is developed later than other color toners, splashing of the black toner on the edge portion of the image can be decreased.

According to the foregoing first embodiment of the present invention, since the amount of the black toner to be used is increased more than the amounts of other color toners at the edge of the toner image which is formed by superimposition, even when the black toner is developed later than other color toners, the black toner is sufficiently superimposed onto the edge of the image so that the change of the hue is decreased, and even when the black toner is developed earlier than other color toners, splashing of the black toner can be decreased at the edge of the image.

Further, the image data is converted by the change of the under color removal (UCR) according to the second embodiment, further, by the change of the modulation transfer function (MTF) according to the third embodiment, and further, by the change of gamma (γ) according to the fourth embodiment, so that the amount of the black toner to be used can be increased more than the amounts of other color toners by a simple structure.

Especially, according to the second embodiment, a preferable result can be obtained without causing a change on the image tone. Further, according to the third and the fourth embodiments, the image has the tendency in which black is easily emphasized at the edge of the image, and therefore it is especially effective to use the foregoing embodiments with the under color removal (UCR).

What is claimed is:

1. A color image forming apparatus comprising:
    (a) an image carrier;
    (b) charging means for charging said image carrier;
    (c) imagewise exposing means for forming a latent image on said image carrier corresponding to image data including a plurality of different color data;
    (d) a plurality of developing means for respectively developing said latent image with a plurality of different colored toners, wherein each of said different colored toners is registered on said image carrier to form a registered color image; and
    (e) converting means for converting an edge portion of said image data corresponding to said registered color image so that a quantity of black toner to be used is increased to be greater than a plurality of quantities of other colored toners to be used to form said registered color image;
    said converting means comprising:
    means for changing an under color removal amount; and
    means for changing a modulation transfer function.

2. A color image forming apparatus comprising:
    (a) an image carrier;
    (b) charging means for charging said image carrier;
    (c) imagewise exposing means for forming a latent image on said image carrier corresponding to image data including a plurality of different color data;
    (d) a plurality of developing means for respectively developing said latent image with a plurality of different colored toners, wherein each of said different colored toners is registered on said image carrier to form a registered color image; and (e) converting means for converting an edge portion of said image data corresponding to said registered color image so that a quantity of black toner to be used is increased to be greater than a plurality of quantities of other colored toners to be used to form said registered color image;

said converting means comprising:

means for changing an under color removal amount; and means for changing a gamma value of a characteristic curve.

3. The apparatus of claim 2, wherein said gamma value represents a value of a linear portion of said characteristic curve that shows a relationship between an exposure amount and a blackened density to provide a numerical value representing a gradation of the color image.

* * * * *